United States Patent [19]

Ju

[11] Patent Number: 5,801,778
[45] Date of Patent: Sep. 1, 1998

[54] VIDEO ENCODING WITH MULTI-STAGE PROJECTION MOTION ESTIMATION

[75] Inventor: John Ju, San Jose, Calif.

[73] Assignee: C-Cube Microsystems, Inc., Milpitas, Calif.

[21] Appl. No.: 652,231

[22] Filed: May 23, 1996

[51] Int. Cl.$^6$ ............................................. H04N 7/30
[52] U.S. Cl. .................... 348/416; 348/390; 348/398; 348/407; 348/413; 348/420; 382/107; 382/236
[58] Field of Search ................................. 348/390, 399, 348/408, 416, 420, 429, 398, 407, 413; 382/107, 236

[56] References Cited

U.S. PATENT DOCUMENTS

| | | | |
|---|---|---|---|
| 5,067,014 | 11/1991 | Bergen et al. | 382/107 |
| 5,107,345 | 4/1992 | Lee | 358/432 |
| 5,122,873 | 6/1992 | Golin | 348/390 |
| 5,142,360 | 8/1992 | Niihara | 348/699 |
| 5,144,429 | 9/1992 | Haghiri et al. | 348/390 |
| 5,200,820 | 4/1993 | Gharavi | 348/416 |
| 5,235,420 | 8/1993 | Gharavi | 348/398 |
| 5,253,055 | 10/1993 | Civanlar et al. | 348/420 |
| 5,262,854 | 11/1993 | Ng | 348/420 |
| 5,278,915 | 1/1994 | Chupeau et al. | 382/236 |
| 5,408,270 | 4/1995 | Lim | 348/429 |
| 5,414,469 | 5/1995 | Gonzales et al. | 348/408 |
| 5,477,272 | 12/1995 | Zhang et al. | 348/407 |
| 5,488,419 | 1/1996 | Hui et al. | 348/402 |
| 5,557,684 | 9/1996 | Wang et al. | 382/107 |

OTHER PUBLICATIONS

"The Cross-Search Algorithm for Motion Estimation," M. Ghanbari, IEEE Transactions on Communications, vol. 38, No. 7, Jul., 1990, pp. 950-953.

"New Fast Algorithm for the Estimation of Block Motion Vectors," B. Liu, A. Zaccarin, IEEE Transactions on Circuits and Systems for Video Technology, vol. 3, No. 2, Apr., 1993, pp. 148-157.

"A Computational Framework and an Algorithm for the Measurement of Visual Motion," P. Anandan, International Journal of Computer Vision, 2, (1989), pp. 283-310.

*Primary Examiner*—Tommy P. Chin
*Assistant Examiner*—Frank Snow
*Attorney, Agent, or Firm*—Meltzer, Lippe, Goldstein, et al.

[57] ABSTRACT

A method and apparatus for performing multi-stage motion estimation on an input video sequence to be encoded. An original image in the video sequence, such as a CCIR601 image, is preprocessed to generate first, second and third reduced resolution images which may be a QQSIF image, a QSIF image and a SIF image, respectively, which are 1/64 size, 1/16 size and 1/4 size, respectively, relative to the original CCIR601 image. A first stage motion vector search is performed on the 1/64 size QQSIF image using a (0,0) motion vector starting point and a first search range suitable for detecting global motion. A second stage motion vector search is performed on the 1/16 size QSIF image using the (0,0) starting point and a second search range smaller than the first search range and suitable for detecting local motion. A third stage motion vector search is performed on the 1/4 size SIF image using starting points based on scaled versions of the motion vectors identified in the first and second stage searches, and a search range smaller than the first and second search ranges. A fourth stage search is then performed on the original image using the motion vectors identified in the third search stage, and a motion compensation type for the original image is determined based on the results of the fourth stage search. An early field/frame decision may be made prior to the performing the fourth stage search, and may be based on a comparison of motion vectors from the first and second stage searches.

32 Claims, 4 Drawing Sheets

VIDEO ENCODING WITH MULTI-STAGE PROJECTION MOTION ESTIMATION

FIELD OF THE INVENTION

The present invention relates to video encoding using an encoding standard such as MPEG-2 and more particularly to video encoding with motion estimation based on projection techniques.

BACKGROUND OF THE INVENTION

Many digital information transmission and processing applications require efficient video compression. MPEG-2 is a well-known video compression standard developed by the International Standards Organization (ISO) Moving Picture Experts Group (MPEG) and documented in "Information Technology Generic Coding of Moving Pictures and Associated Audio Information: Video," ISO/IEC DIS 13818-2 (Video), which is incorporated herein by reference. MPEG-2 video compression involves both spatial and temporal compression of video frames or fields. Spatial compression reduces redundancy within a single video frame or field, while temporal compression reduces redundancy between multiple frames and/or fields. Video frames or fields will both also be referred to herein as video pictures or video images.

An exemplary MPEG-2 video encoder receives a sequence of video frames or fields from a video source such as a video camera or a telecine machine. The sequence of frames may be progressive or interlaced. A progressive sequence may have a frame rate of 30 frames per second. An interlaced sequence generally includes two fields for each frame, with a top field corresponding to even numbered lines and a bottom field corresponding to odd numbered lines. An interlaced sequence at a frame rate of 30 frames per second will therefore have a field rate of 60 fields per second. A telecine machine converts film at 24 frames per second into a 60 field per second digital video signal using a 3:2 pulldown technique. The 3:2 pulldown technique generates three video fields for one film frame, two video fields for the next frame, three video fields for the next frame and so on in a 3,2,3,2, ... pattern. For a film frame which is converted into three video fields, the third field is generally a repeat of the first field. The frames in the video sequence may be converted to SIF resolution images made up of a plurality of adjacent macroblocks, with each macroblock including, for example, four 8×8 blocks of luminance pixels and two 8×8 blocks of chrominance pixels.

Spatial compression is applied to each of the macroblocks using the techniques of transform encoding, quantization, scanning, run-amplitude encoding and variable length coding. Transform encoding involves applying a discrete cosine transform (DCT) to each 8×8 block of pixels in a given macroblock to thereby generate an 8×8 block of DCT coefficients. The DCT coefficients are then quantized by dividing each coefficient by a quantizer step size which is the product of a weighting matrix element and a quantization scale factor selected for the given macroblock. The human eye is generally more sensitive to the lower frequency coefficients than the higher frequency coefficients. As such, the quantization step size is varied depending on the frequency of the coefficient that is quantized so that the low frequency coefficients can be mapped to a larger selection of values than the high frequency coefficients.

The resulting quantized coefficients are scanned using a zig-zag scanning process which tends to aggregate zero-amplitude quantized coefficients. The resulting sequence can then be divided into a number of subsequences, each including a run of zero quantized coefficients followed by a single non-zero quantized coefficient. The subsequences are then run-amplitude encoded to produce a pair of numbers corresponding to the number of zero coefficients in the run and the amplitude of the single non-zero coefficient following the run. The run-amplitude pairs thus formed are then variable length encoded using a predetermined table which assigns a codeword to each anticipated run-amplitude pair. The table of codewords is configured such that run-amplitude pairs which are anticipated to occur more frequently are assigned shorter codewords. In order to further reduce the amount of encoded data, a given block encoded as only zero-amplitude coefficients need not be assigned a codeword. The presence of such a block in the sequence can be indicated using a coded block pattern value in a macroblock header.

MPEG-2 defines three different types of pictures, which as noted above may be either frames or fields. The following description will assume that the pictures are frames. The three types of MPEG-2 frames are intracoded (I) frames, forward-only predictive (P) frames and bidirectionally predictive (B) frames. I frames contain macroblocks which are intracoded using the above-described spatial encoding techniques but are not temporally encoded. P frames can contain macroblocks which are (a) intracoded or (b) unidirectional forward predictive coded using temporal encoding relative to a previous reference frame. A P frame macroblock may be predicted from a macroblock of an I frame or another P frame. B frames can contain macroblocks which are (a) intracoded, (b) unidirectional forward predictive coded, (c) unidirectional backward predictive coded using temporal encoding relative to a subsequent reference frame, or (d) bidirectionally predictive coded using temporal encoding relative to both previous and subsequent reference frames. A B frame macroblock may be predicted from a macroblock of an I frame or a P frame, but no predictions are made from B frame macroblocks. There are thus several options available for encoding each macroblock of P and B frames. The decision as to which type of encoding to perform is generally made on a macroblock-by-macroblock basis. B frames generally have the smallest number of bits when encoded, while I frames have the most. B frames therefore achieve the greatest degree of compression. It should be noted that for I, B, and P frames, the number of resulting encoded bits can be varied by adjusting the quantizer step size used to spatially encode each macroblock. A macroblock encoded using a large quantizer step size results in fewer bits than the same macroblock encoded using a smaller quantizer step size.

Temporal encoding is applied to a given macroblock using the techniques of motion estimation and motion compensation. The macroblock to be encoded is also referred to herein as a target macroblock or simply a target block, while the frame or field containing the target block is referred to as a target frame or target field, respectively. The motion estimation process makes use of a search window in the reference frame. The search window generally specifies the portion of the reference frame which will be searched in order to locate a macroblock which best matches a given target macroblock. The minimum size of the search window is determined by the horizontal and vertical search ranges which are used. The search ranges generally specify the maximum horizontal and vertical motion displacement from a set of starting coordinates for a given target block. For example, if a motion estimation process uses a horizontal search range of +H/−H pixels and a vertical search range of +V/−V pixels, the minimum search window dimension for an N×N pixel target block is given by (N+2H)×(N+2V).

A block matching algorithm is used to identify the reference frame macroblock within the specified search window which best matches the target macroblock. The identified reference frame macroblock is referred to as a predictive macroblock. A motion vector is then generated to indicate a translation between the pixel coordinates of the predictive macroblock and the target macroblock. Motion compensation involves generating a prediction error macroblock as the difference between the predictive macroblock and the target macroblock. The prediction error macroblock may then be spatially encoded as described above. The motion vector may be variable length encoded and outputted with the spatially encoded prediction error macroblock. For B frames, a bidirectionally predictive macroblock is generated by interpolating between a predictive macroblock from a previous reference frame and a predictive macroblock from a subsequent reference frame. Two motion vectors are generated to indicate translations between the pixel coordinates of the previous and subsequent predictive macroblocks and the target macroblock. A prediction error macroblock is generated as the difference between the bidirectionally predictive macroblock and the target macroblock. The prediction error macroblock and motion vectors are then encoded as in the general case previously described.

In the case of interlaced frames, the temporal encoding reference may be a previous or subsequent field. For example, predictions can be made independently for the macroblocks of each field by using data from one or more previous fields and/or subsequent fields. The decision to perform frame or field based encoding can be made on a frame-by-frame basis. Frame based encoding is typically preferred when the video scene contains significant detail with limited motion, while field based encoding generally works better when the video scene includes rapid motion. If frame based encoding is chosen for a given interlaced frame, the field/frame encoding decision can be made on a macroblock-by-macroblock basis. It should also be noted that a technique known as dual prime may be used to encode a given interlaced frame. The dual prime technique determines predictive macroblocks in both fields of a reference frame. The two predictive macroblocks are interpolated to form a prediction error macroblock. First and second motion vectors are then formed to provide translations between the target macroblock and the fields of the reference frame. The first motion vector is encoded while the second is subtracted from the first to form a differential motion vector that is also encoded.

Conventional motion estimation techniques applied in the above-described MPEG-2 video encoding generally utilize either an exhaustive search strategy or a hierarchical search strategy to identify the best-match predictive macroblocks and the corresponding motion vectors. An exhaustive search will generally provide better memory efficiency than a hierarchical search for relatively small search ranges, such as +7/−7 pixels. However, the computation requirements of the exhaustive search approach increase exponentially with the search range. The exhaustive search approach is therefore generally impractical for encoding frame sequences for television and other real-time broadcast video applications. The conventional hierarchical search strategy is more likely to produce inaccurate motion vectors, leading to a less than satisfactory compression result. In MPEG-2 video applications, a relatively large +128/−128 pixel search range is often used, and a tradeoff is made between coding and computation efficiencies by using decimated images instead of original images in performing an exhaustive or hierarchical search. Unfortunately, available techniques are generally unable to both reduce the computation requirements and improve the coding efficiency.

The conventional techniques suffer from a number of other problems. For example, a block-based motion estimation technique described in M. Ghanbari, "The Cross-Search Algorithm for Motion Estimation," IEEE Transactions on Communications, Vol. 38, No. 7, pp. 950–953, July 1990 may exhibit irregular memory access problems when used in a special-purpose hardware implementation such as a typical video encoder. The Ghanbari approach also tends to produce motion vectors which are not well-suited to subsequent coding operations. Another block-based motion estimation technique, described in B. Liu and A. Zaccarin, "New Fast Algorithms for the Estimation of Block Motion Vectors," IEEE Transactions on Circuits and Systems for Video Technology, Vol. 3, No. 2, pp. 148–157, April 1993, may produce acceptable coding results for limited search ranges on the order of +16/−16 pixels. However, this technique fails to address adequately the memory requirements of typical video encoding applications. For example, current memory technology may require data to be accessed consecutively from memory in order to achieve a high memory bandwidth. The use of irregular memory spaces and non-consecutive memory access in the Liu et al. approach may result in a memory access bottleneck in many important encoding applications. A prior art hierarchical motion estimation method used for computing optical flow is described in P. Anandan, "A Computational Framework and an Algorithm for the Measurement of Visual Motion," International Journal of Computer Vision, No. 2, pp. 283–310, Kleuter Academic Publishers, Boston Mass., 1989. Optical flow generally involves generating accurate motion vectors for each pixel used in a computer vision field. Although the described technique may produce acceptable results for pixel-based motion vectors in certain applications, the technique does not appear to be directly applicable to block-based motion estimation applications, and fails to address adequately the issue of computation efficiency.

As is apparent from the above, a need exists for an improved motion estimation technique which avoids the problems of the conventional exhaustive search and hierarchical approaches.

SUMMARY OF THE INVENTION

The present invention provides a method and apparatus for multi-level projection motion estimation. The multi-level motion estimation may be used in video sequence encoding to identify motion vectors and motion compensation types. For a given target block of a current picture or image in the video sequence, the motion estimation technique may be used to determine one or more motion vectors which serve as translations between the target block and the pixel coordinates of a predictive block in one or more reference images.

In accordance with one embodiment of the invention, an original image in the video sequence to be encoded, such as a CCIR601 image, is processed to generate first, second and third reduced resolution images which may be a QQSIF image, a QSIF image and a SIF image, respectively, which are 1/64 size, 1/16 size and 1/4 size, respectively, relative to the original CCIR601 image. A first stage motion vector search is performed on the 1/64 size QQSIF image using a (0,0) motion vector starting point and a first search range suitable for detecting global motion within the original image. Global motion refers generally to motion involving many objects in a given image, such as the motion produced by a panning or zooming operation. A second stage motion vector search is performed on the 1/16 size QSIF image using the (0,0) starting point and a second smaller search range suitable for detecting local motion within the original image. Local motion refers generally to motion involving small and/or irregular movements of a particular object or objects in a given image. A third stage motion vector search is performed on the 1/4 size SIF image using a starting point based on scaled versions of the motion vectors identified in the first and second stage searches, and a search range smaller than the first and second search ranges. A fourth stage search is then performed on the original image or a reconstruction thereof using the motion vectors identified in the third search stage. A motion compensation type and a suitable set of motion vectors for the original image is determined based on the results of the fourth stage search. The motion estimation may be implemented in a preprocessor, video compression circuit and/or other hardware, software or firmware of a video encoder.

The motion estimation of the present invention provides faster throughput relative to conventional exhaustive search techniques, and more accurate motion vectors and motion compensation relative to conventional hierarchical search techniques. The present invention reduces computation requirements relative to prior art techniques while also improving the coding efficiency. This is in part attributable to the use of first and second search stages, with the first stage detecting global motion with minimal computation, and the second stage detecting local motion using a limited search range. The first and second stage searches may utilize an exhaustive search approach and can be readily implemented using a hardware configuration which provides efficient off-chip memory access. Memory access requirements are reduced because neighboring blocks can share a larger overlapped search window, such that frequent reloading of search windows from off-chip memory is avoided. In addition, the third stage search of the present invention generates highly accurate motion vectors which allow early motion compensation decisions to be made and thereby reduces the amount of compensation needed in the original images. For example, an early field/frame decision may be made during the third stage search, or after completion of the third stage search but prior to the fourth stage search, and may be based on a comparison of motion vectors.

DETAILED DESCRIPTION OF THE INVENTION

The present invention will be illustrated below in conjunction with an exemplary video encoding system suitable for generating an MPEG-2 compliant video bit stream. It should be understood that the invention is more broadly applicable to numerous alternative encoding and video signal processing applications. The motion estimation of the present invention can provide significant advantages in any application which involves encoding a sequence of video fields or frames. For example, although illustrated in the context of MPEG-2 compliant encoding, the invention may also be used in conjunction with other video encoding standards including MPEG-1, H.263 and H.26p. The motion estimation techniques of the invention may utilize field or frame coding or combinations thereof as well as other techniques such as dual prime. The terms "picture" and "image" will be used herein to refer to either a frame or a field of a given video sequence. The term "global motion" as used herein refers generally to motion involving many or most objects in a given image, such as the motion produced by a typical panning or zooming operation. The term "local motion" as used herein refers generally to motion involving relatively small and/or irregular movements of a particular object or objects in a given image.

Figure 1:
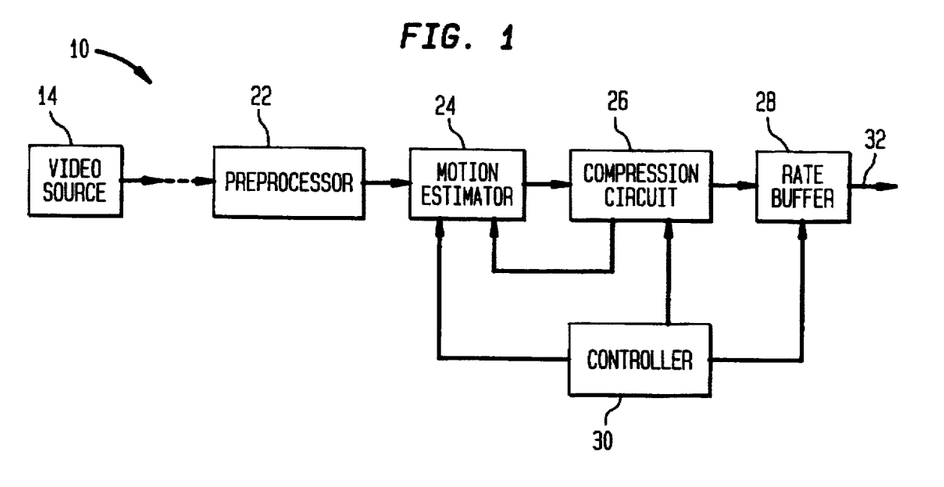
FIG. 1 is a block diagram of an exemplary video encoding system in which the motion estimation of the present invention may be implemented.

FIG. 1 is a block diagram of an exemplary video encoding system 10 in which the motion estimation of the present invention may be utilized. The system 10 includes a digital video source 14 which may include a video camera, telecine machine or other suitable source. The video source 14 supplies an input video frame sequence to a preprocessor 22 which may be part of an MPEG-2 compliant video encoder. The encoding system 10 also includes a motion estimator 24, a compression circuit 26, a rate buffer 28 and a controller 30, all of which may also be elements of one or more processors in an MPEG-2 compliant encoder. The operations of motion estimator 24, compression circuit 26 and rate buffer 28 are directed in this exemplary encoding system by the controller 30. The resulting encoded video bit stream at the output of the rate buffer 28 is transmitted via a transmission channel 32 to one or more decoders which decode the received bit stream. Alternatively, the video bit stream may be transmitted via channel 32 to a magnetic or electronic memory, a recordable compact disk (CD) or other suitable storage device.

The preprocessor 22 processes the video signal so that it may be properly compressed using the motion estimator 24 and compression circuit 26. For example, the preprocessor 22 may alter the format of each frame in terms of the horizontal or vertical pixel resolution in order to satisfy parameters specified by the motion estimator 24 or compression circuit 26. An exemplary set of preprocessing operations used to generate different resolution images for use in the motion estimation of the present invention will be described below. The preprocessor 22 may also be used to detect scene changes or other characteristics of the video sequence which increase compression difficulty. A scene change generally increases the amount of bits required because predictive encoding cannot initially be used. If the preprocessor 22 detects a scene change, this information may be communicated to the compression circuit 26 and controller 30. A fade, representing a continuous decrease or increase in luminance level to or from black over several frames, can also cause difficulties for the compression circuit 26 because it can cause a failure in motion compensated prediction. The preprocessor 22 can detect and inform the compression circuit 26 of a fade so that the compression circuit 26 can take appropriate precautions.

The motion estimator 24 receives a video signal from the preprocessor 22 in the form of a sequence of frames or fields, and performs motion estimation operations to be described in greater detail below. The compression circuit 26 utilizes motion vectors and other information supplied by motion estimator 24 to generate a compressed digital video bit stream compliant with the syntax specified in MPEG-2 or another suitable video compression standard. The video bit stream generated by the compression circuit 26 is stored in a rate buffer 28. The controller 30 controls the number of bits allocated by the compression circuit 26 to the frames or fields to be encoded. The controller 30 allocates bits to the frames or fields so as not to exceed the bandwidth in the channel 32 and so as to maintain certain limits on the occupancy of the rate buffer 28. This is turn prevents overflow and/or underflow conditions in a decoder buffer receiving the bit stream from the transmission channel 32, a storage device or other source of encoded video. The present invention provides improved motion estimation (ME) techniques which may be implemented using the preprocessor 22, motion estimator 24, compression circuit 26 and controller 30 of FIG. 1, or other suitably configured video processing hardware, firmware and/or software. It should be noted that the preprocessor 22, motion estimator 24 and compression circuit 26 may represent different portions of a single digital data processor, or different functional operations performed using such a data processor. For example, the preprocessor 22, motion estimator 24 and compression circuit 26 may perform operations utilizing, at least in part, the same processor hardware.

Figure 2:
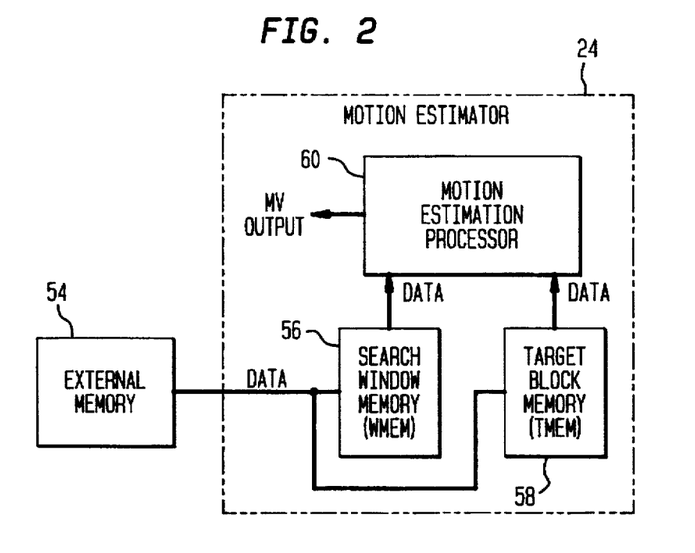
FIG. 2 shows an exemplary hardware implementation of a motion estimation device which serves to illustrate the improved memory access features of the present invention.

FIG. 2 shows an exemplary implementation of a motion estimator 24 in accordance with the present invention. This exemplary implementation is used to illustrate the memory access operations associated with motion estimation, and should not be construed as limiting the invention to any particular type of implementation. For example, the motion estimator 24 may be a portion of a single-chip application-specific integrated circuit (ASIC) or other circuit which provides video compression operations to be described below, and which may also incorporate various functions of the preprocessor 22, compression circuit 26 and controller 30 of FIG. 1. The motion estimator 24 of FIG. 2 may receive image data from an external memory 54 which may be an off-chip dynamic random access memory (DRAM) contained within a video encoder but not within the motion estimator 24. The external memory 54 may be used to store, for example, decimated images generated by the preprocessor 22 for use in the motion estimation process. It will be assumed for the remainder of the description that the external memory 54 is in the form of DRAM, although the invention may be utilized with other types of memory. The motion estimator 24 includes internal or on-chip memory in the form of a search window memory (WMEM) 56 and a target block memory (TMEM) 58, which may be different portions of a single internal memory. The WMEM 56 and TMEM 58 are used to hold search window data and target block data, respectively, for a given image as received from the external memory 54. The motion estimator 52 also includes an ME processor 60 which performs searching operations using the data stored in WMEM 56 and TMEM 58, and generates motion vectors which are used in the compression circuit 26. As will be described in more detail below, the exemplary implementation of FIG. 2 may be used to provide an estimate of the number of ME cycles and DRAM access cycles required in a given ME operation.

The number of ME cycles and DRAM access cycles utilized in an exemplary embodiment of the present invention may be estimated as follows. The ME processor 60 may use on the order of (8+ND) ME cycles for each target block to be searched, where ND refers to the number of distortions and is given by $(2A+1)^2$ for a search range of $+A/-A$ pixels. The estimated number of ME cycles used to search four 8×8 target blocks over a search range of +6/−6 pixels is therefore 4×(8+(13×13)) or 708 ME cycles. The number of DRAM cycles used to load a target block of N1×N2 pixels may be estimated as (10+(N1×N2/8)), and the number of DRAM cycles used to load an unaligned search window of size (M1×M2) may be estimated as (10+((M1/8)+1)×M2). The number of DRAM cycles used to load the four 8×8 target blocks is therefore (10+(8×2/8)×8×2) or 42 cycles, while the number of DRAM cycles used to load the search window is (10+(((6+6+8+8)/8)+1)×8×2) or 82 cycles. This estimate assumes that there is no horizontal or vertical split, or sharing of a search window between adjacent macroblocks, and that the search window memory WMEM 56 can hold the entire search window. If WMEM 56 does not include sufficient memory to hold the entire search window, it may be necessary to reload overlapped portions using, for example, a double buffer WMEM. It should be emphasized that these and any other estimates provided herein are intended to illustrate the memory access process of an exemplary embodiment of the invention, and should not be construed as limiting the invention to any particular embodiment or group of embodiments. For example, it will be apparent from the remaining description that the invention may be implemented in embodiments for which the above-described cycle estimates are inapplicable.

Figure 3:
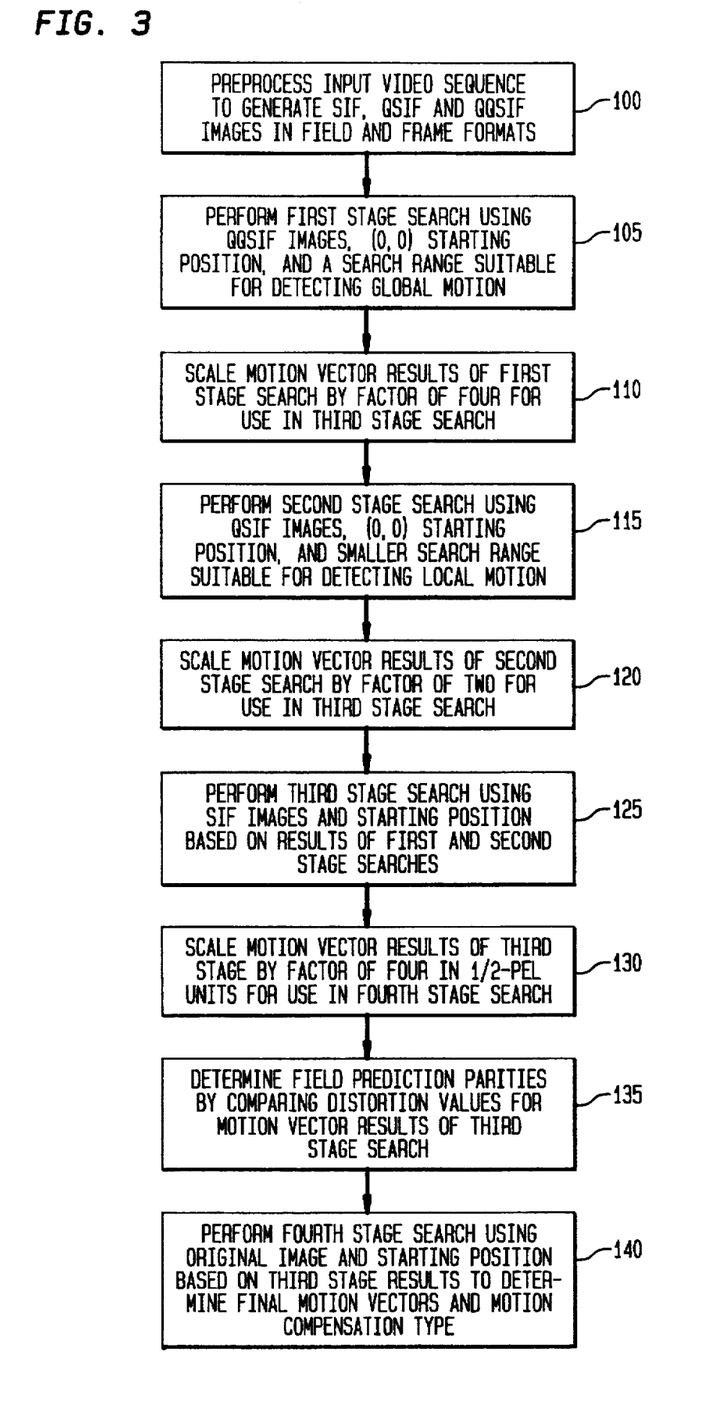
FIG. 3 is a flow diagram of the steps in an exemplary motion estimation process in accordance with one embodiment of the invention.
Figure 4:
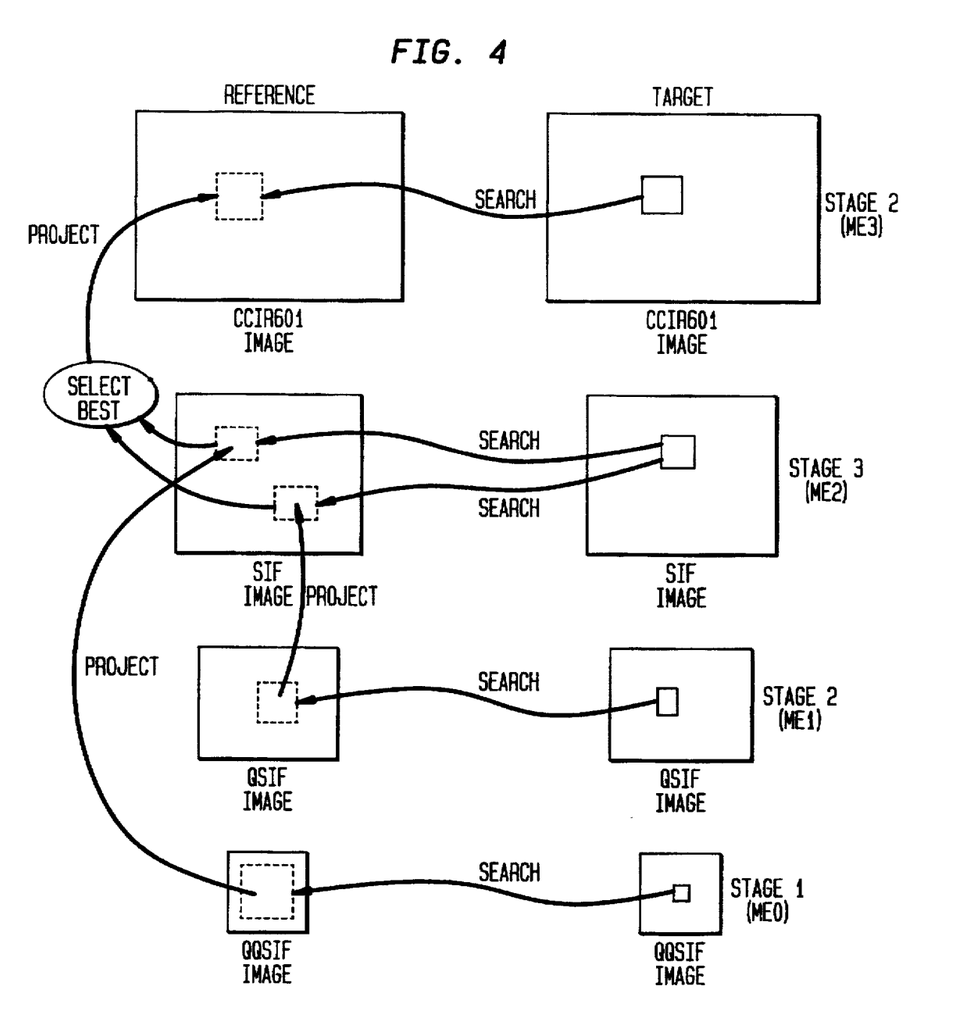
FIG. 4 illustrates the motion estimation process of FIG. 3 as applied to an exemplary set of images.

FIG. 3 is a flow diagram illustrating a multi-stage hierarchical ME algorithm in accordance with an exemplary embodiment of the invention in which each stage utilizes a different resolution subsampled image. FIG. 4 is a corresponding illustration of the processing steps as applied to exemplary target and reference frames, showing the four different resolution images for each frame. The four stages of the exemplary algorithm are referred to as the ME0, ME1, ME2, and ME3 or first, second, third and fourth stages, respectively. The ME0 and ME1 stages in this exemplary embodiment perform independent motion vector (MV) searches using a specified search range starting from a (0,0) vector position. The ME2 stage then performs a search which uses the results of the ME0 and ME1 searches to initialize the starting search position. The ME3 stage performs the final search using reconstructed versions of the original images.

The exemplary motion estimation algorithm illustrated in FIG. 3 and described below is specified for coding with values of M greater than unity, where M refers to the frame distance between two reference images. The illustrative embodiment utilizes same-field and opposite-field motion vectors and frame motion vectors. The top or even field of a given frame is designated herein as field A and the bottom or odd field is designated field B. The different types of motion vectors are designated AA, BA, BB, AB and Frame (F) in which the motion vector AB represents a translation between a target field B and a reference field A. As noted above, the target field refers to the field being encoded and the reference field is a previous or subsequent field on which prediction of the target field will be based. The exemplary motion estimation algorithm will be illustrated using CCIR601 video frames with a frame resolution of 720×480 pixels. A wide variety of other resolutions could also be used. Pseudocode examples will be provided to demonstrate the operation of the different search stages. It should be emphasized that the pseudocode is intended for illustration and should not in any way be construed as limiting the invention to particular software, firmware and/or hardware implementations.

In the exemplary pseudocode shown below, a data structure MV is defined to store either one motion vector or a motion compensation (MC) prediction error block with a set of motion vectors. The number of motion vectors in the set depends on the type of MC prediction. For example, field forward prediction will result in two motion vectors, bidirectional field interpolation prediction will result in four motion vectors, and simple frame or field motion prediction will result in one vector.

```
typedef structure {
    x[MAX];                         /*x vectors*/
    y[MAX]                          /*y vectors*/
    vertical_field_select[MAX];     /*parity field selection for field vectors */
    sae;                            /*sae error from ME processor*/
    activity;                       /*activity defined as in rate control*/
    type;                           /*type = field, frame} x {Forward,
                                    /*       Backward, Interpolation}*/
}MV;
MV Search(MV vector);
MV Predictor(MV vector1, MV vector2, . . . );
MV Best_Sae(MV vector1, MV vector2, . . . );
MV Best_Activity(MV vector1, MV vector2, . . . );
```

The function Search (MV vector) returns the motion vector with the lowest distortion in the search range using vector as the initial search point. It should be noted that the search range and reference frame designation are omitted in the pseudocode for clarity. The function Predictor (MV vector1, MV vector2, . . .) combines the specified set of motion vectors and returns an MC prediction type which is also represented in the MV data structure. For example, combining field A and field B motion vectors will form a field prediction MC, and combining forward frame and backward frame motion vectors will form a frame interpolation prediction MC. The function Best_Sae(MV vector1, MV vector2, . . .) returns the motion vector or MC prediction type which has the lowest distortion value. The function Best_Activity(MV vector1, MV vector2, . . .) returns the vector or MC prediction which has the lowest activity value. If an activity value does not exist for the frame or field being searched, the Best_Activity function could be configured to calculate an activity value for that frame or field. The activity value could be a measurement metric such as the mean absolute error (MAE) or mean square error (MSE) metrics typically used in conventional block-based motion estimation. Alternatively, the activity value could potentially provide a more accurate estimate of coding efficiency by using a metric such as the variance of pixel differences.

Preprocessing

As noted above, the different ME search stages utilize different resolution images. Step 100 of FIG. 3 indicates that preprocessing is used to generate these different resolution images from the original video sequence. The preprocessing may be performed in the preprocessor 22 and/or motion estimator 24 of FIG. 1. In this example, captured luminance (Y) images are filtered and subsampled horizontally and vertically to obtain SIF resolution images in both field and frame formats. The SIF images represent ¼ size images relative to the original CCIR601 image. The SIF images are again filtered and subsampled horizontally and vertically to obtain QSIF images in both field and frame formats. The QSIF images represent 1/16 size images relative to the original CCIR601 images. The QSIF images are further filtered and subsampled to obtain QQSIF images in both field and frame formats. The QQSIF images represent 1/64 size images relative to the original CCIR601 images. The filters used may be simple averaging filters such as two-tap filters with filter coefficients (½, ½). The resulting subsampled frames are used in frame ME searches, and the resulting subsampled fields are used in field ME searches. TABLE 1 below shows the image resolutions produced by this exemplary preprocessing operation. As noted above, FIG. 4 shows an exemplary set of CCIR601, SIF, QSIF and QQSIF images for given target and reference frames.

TABLE 1

| Picture | Frame | Field A | Field B | Total |
|---------|-------|---------|---------|-------|
| CCIR601 | 720 × 480 | 720 × 240 | 720 × 240 | 345,600 |
| SIF | 360 × 240 | 360 × 120 | 360 × 120 | 172,800 |
| QSIF | 180 × 120 | 180 × 60 | 180 × 60 | 43,200 |
| QQSIF | 90 × 60 | 90 × 30 | 90 × 30 | 10,800 |
| TOTAL | 459,000 | 56,700 | 56,700 | 572,400 |

The ME0 Search Stage

Step 105 of FIG. 3 indicates that the first (ME0) search stage of the ME search process is performed using QQSIF resolution images, a (0,0) motion vector starting position and a search range suitable for detecting global motion in the original image. As noted above, global motion refers generally to motion involving many or most of the objects in a given image, such as the motion produced by a panning or zooming operation. An 8×8 pixel block size is used for both field and frame searches. For each reference block, the above-noted AA, BB, BA, AB, and F motion vectors are searched. A bias may be added to the zero motion vector score so that a zero motion result will be chosen when almost any motion vector performs equally well, as will be the case in, for example, flat areas of the video sequence. This bias is typically less than zero and may be selected in the range between about −100 and 0.

In the case of P frames, a suitable horizontal search range for both fields and frames is +24/−24 pixels. Suitable vertical search ranges for fields and frames are +7/−7 and +14/−14, respectively. The search window size for the QQSIF frame is therefore 56×36 and for the QQSIF field is 56×22. As noted in TABLE 1 above, the size of a QQSIF frame is 90×60 pixels and a QQSIF field is 90×30 pixels. The reference block size is 8×8 pixels, such that 12×8 reference blocks are required to cover the QQSIF frame and 12×4 reference blocks to cover the QQSIF field.

It should be noted that if the search windows for several target blocks have a large overlapped area, a larger search window covering all of the search windows for the several target blocks can be loaded at the same time to avoid reloading search windows from external memory 54. For example, if two horizontally adjacent blocks of 8×8 block size need to search starting from the (0,0) motion vector position with a range of +8/−8, then one search window size will effectively be (8×2+8)×(8×2+8) or 24×24. Since both blocks are starting from the (0,0) position, a search window size of (8×2+8+8)×(8×2+8) or 32×24 can be loaded to accommodate both target blocks. This sharing of a common search window by two horizontally adjacent target blocks is referred to herein as a horizontal split. A vertical split occurs when two vertically adjacent target blocks share the same search window.

In the case of B frames, a suitable horizontal search range for both fields and frames is +16/−16. Suitable vertical search ranges for fields and frames are +5/−5 and +10/−10, respectively. There are a total of 8 field searches and 2 frame searches performed in the ME0 stage for each B frame. The reference block size is again 8×8 pixels, and a search window of 40×28 pixels is used for frames and 40×18 pixels for fields.

After the ME0 search stage is complete, step 110 of FIG. 3 indicates that the motion vector results are scaled by a factor of four for use in the ME2 search stage to be described in detail below. As shown in FIG. 4, the result of the ME0 search is used to project a starting position in the SIF image for the ME2 search. The ME0 search process is illustrated by the following pseudocode:

```
For each reference block (i,j)
    For each XX (F,AA,BB,BA,AB)
        For each DD (Forward, Backward)
            XX_DD_MV_Level_0(i,j) = Search(Zero_MV)*4;
```

The ME1 Search Stage

Step 115 of FIG. 3 indicates that the second (ME1) search stage is performed using QSIF images, a (0,0) motion vector starting position and a smaller search range suitable for detecting local motion in the original image. As noted above, local motion refers generally to motion involving small and/or irregular movements of a particular object or objects in a given image. The ME1 search stage is similar to the above-described ME0 search stage in that it also searches around the vector (0,0) position and uses a block size of 8×8 pixels for both field and frame searches. However, the ME1 stage uses higher resolution images and a significantly smaller search range than those used in the ME0 search.

In the case of P frames, each of the motion vectors AA, BA, BB, AB and F is searched, for a total of 5 motion vector searches. A suitable horizontal and vertical search range for both fields and frames is +6/−6. As noted in TABLE 1 above, the size of a QSIF frame is 180×120 pixels and a QSIF field is 180×60 pixels. The reference block size is 8×8 pixels, such that 23×15 reference blocks are required to cover the QSIF frame and 23×8 reference blocks to cover the QSIF field. The search window size for the QSIF frame and field is selected as 20×20.

In the case of B frames, each of the motion vectors AA, BA, BB, AB and F is searched both forward and backward, for a total of 10 motion vector searches. A suitable horizontal and vertical search range for both fields and frames is +6/−6. The same 20×20 search window size used for P frames is used for B frames.

Step 120 of FIG. 3 indicates that the motion vectors from the ME1 search are scaled by a factor of 2 for use in the ME2 search stage to be described in detail below. As shown in FIG. 4, the result of the ME1 search is used to project a starting position in the SIF image for the ME2 search. The ME1 search process is illustrated by the following pseudocode:

```
For each reference block (i,j)
    For each XX (F,AA,BB,BA,AB)
        For each DD (Forward, Backward)
            XX_DD_MV_Level_1(i,j) = Search(Zero_MV)*2;
```

The ME2 Search Stage

Step 125 of FIG. 3 indicates that the third (ME2) search stage uses SIF resolution images. A block size of 8×8 pixels is used for all types of motion vectors. As noted above, the motion vectors resulting from the ME0 and ME1 search stages are scaled by factors of four and two, respectively, and are used as the initial starting points in the ME2 search. Instead of searching around the (0,0) motion vector as a starting point, the ME2 stage thus searches around ME0 and ME1 motion vectors with overlapped reference blocks.

A suitable horizontal and vertical search range is +2/−2 for both fields and frames and for both P and B frames. As noted in TABLE 1 above, the size of a SIF frame is 360×240 pixels and a SIF field is 360×120 pixels. The reference block size is again selected as 8×8 pixels, such that 45×30/4 reference blocks are required to cover the SIF frame and 45×15/4 reference blocks to cover the SIF field. The search window size for the SIF frame and field is selected as 20×20. Because the effective block sizes of the ME0 and ME1 searches cover 2×2 and 4×4 groups of blocks searched at the ME2 level, respectively, a given motion vector from the ME0 and ME1 searches will be repeatedly used by 16 and 4 adjacent blocks, respectively, during the ME2 search. It should be noted that memory bandwidth requirements are greatly reduced as a result of this reuse of search windows in accordance with the present invention.

Step 130 of FIG. 3 indicates that the motion vectors from the ME2 search are scaled by a factor of four in half-pel units for use in the ME3 search stage to be described in detail below. As shown in FIG. 4, the best search result of the ME2 search is selected and used to project a starting position for the ME3 search. The ME2 search process is illustrated by the following pseudocode in which the operator '>>' denotes a right shift operation:

```
For each reference block (i,j)
    For each XX (F,AA,BB,BA,AB)
        For each DD (Forward, Backward)
            XX_DD_MV_Level_2(i,j) = Best_Sae(Search
                                    (XX_DD_MV_Level_0(i>>2,j>>2)),
                            Search(XX_DD_MV_Level_1(i>>1,j>>1));
```

Step 135 of FIG. 3 indicates that the parities of field predictions are generally determined after completion of the ME2 search. The parities may be designated by a variable such as motion_vertical_field_select. The field A parity can be determined by comparing the distortion values of motion vectors AA and BA, with the lower distortion indicating field A parity. Similarly, the field B parity can be determined by comparing the distortion values of motion vectors BB and AB, with the lower distortion indicating field B parity. The parity determination operation is illustrated by the following pseudocode:

```
For each reference block (i,j)
    For each DD (Forward, Backward)
        FieldA_DD_MV_Level_2(i,j) =
        Best_Sae(AA_DD_MV_Level_2(i,j),BA_DD_MV_Level_2(i,j));
        FieldB_DD_MV_Level 2(i,j) =
        Best_Sae(BB_DD_MV_Level_2(i,j),AB_DD_MV_Level_2(i,j));
```

The ME3 Search Stage

Step 140 of FIG. 3 corresponds to the fourth (ME3) search stage and the final stage in the illustrative ME search process. The resulting motion vectors may be utilized to determine a motion compensation type for the frame or field to be encoded. The ME3 search utilizes half-pel resolution images and a block size of 16×16 pixels for frame search and 16×8 pixels for field search in accordance with the requirements of the MPEG-2 specification. As shown in FIG. 4, the search is performed from a starting point indicated by a motion vector identified in the third search stage. The reference frames for the half-pel images may be reconstructed images from an encoder loop rather than the original full-resolution CCIR601 images. The half-pel pixels can be generated by averaging the neighboring full-pel pixels. Alternatively, the original CCIR601 images could be used. A suitable horizontal and vertical search range is +3/−3 in half-pel units or +1.5/−1.5 in full-pel units. A search window size of 20×20 is used. Because the effective field block size of the ME2 search covers a 1×2 group of field blocks searched at the ME3 level, a given motion vector from the ME2 search will be repeatedly used by 2 vertically adjacent blocks during the ME3 search. A vertical split of the search window is therefore used in this example of the ME3 field search.

In the case of P frames, field and frame vectors are searched and the motion vectors with the lowest distortion determine the MC type. The ME3 search process for P frames is illustrated in the following pseudocode:

```
For each reference block (i,j)
    Field_Forward_MV(i,j) = Predictor(Search(FieldA_Forward_MV_Level_2(i,j>>1)),
                                        Search(FieldB_Forward_MV_Level_2(i,j>>1));
    Frame_Forward_MV(i,j) = Search(Frame_Forward_MV_Level_2(i,j));
    MV(i,j) = Best_Sae(Field_forward_MV(i,j) + field_penalty,Frame_Forward_MV(i,j));
```

The field_penalty in the above pseudocode is a constant to be added to a motion vector distortion value and in this embodiment may be selected in the range between about 0 and 300. The field_penalty accounts for the fact that field motion compensation requires generation of an additional motion vector.

In the case of B frames, field and frame vectors are searched in both forward and backward directions, the resulting distortion for field and frame modes is compared, and the vectors with the lowest distortion value determine the field/frame mode. The activity values are then calculated for forward, backward, and interpolation predictions. The prediction with the lowest activity value determines the MC type. It should be noted that there are six possible MC types in a B frame, forward, backward and interpolation MC types for both field and frame. In this exemplary embodiment, the relatively simple distortion metric is used to make the field/frame mode decision and the more accurate activity metric is used to make the forward/backward/interpolation decision. If a given digital signal processor (DSP) performing the search process has sufficient time and memory, the activity values for all six possible MC types could be calculated and the MC decision based on the activity values for all six types. The ME3 search process for B frames is illustrated in the following pseudocode:

```
For each reference block(i,j)
    For each DD (Forward, Backward)
        Field_DD_MV(i,j) = Predictor(Search(FieldA_DD_MV_Level_2(i,j>>1)),
                                     Search(FieldB_DD_MV_Level_2(i,j>>1));
        Frame_DD_MV(i,j) = Search(Frame_DD_MV_Level_2(i,j);
    Field_Frame_MV = Best_Sae(Field_Forward_MV(i,j) + field_penalty,
                              Field_Backward_MV(i,j) + field_penalty,
                              Frame_Forward_MV(i,j),Frame_Backward_MV(i,j);
    if(Field_Frame_MV.type = = Field)
        Interpolation_MV = Predictor(Field_Forward_MV(i,j),
                                      Field_Backward_MV(i,j));
        MV(i,j) = Best_Activity(Field_Forward_MV(i,j),Interpolation_MV(i,j) +
                                interpolation_penalty,Field_Backward_MV(i,j);
    else /*frame mode*/
        Interpolation_MV = Predictor(Frame_Forward_MV(i,j),
                                      Frame_Backward_MV(i,j));
        MV(i,j) = Best_Activity(Frame_Forward_MV(i,j),Interpolation_MV(i,j) +
                                interpolation_penalty,Frame_Backward_MV(i,j);
```

The interpolation_penalty accounts for the fact that four motion vectors are used for bidirectional motion compensation and in this embodiment may be selected in the range between about 0 and 500. The field_penalty for use with B frames may be the same as that used for P frames.

Many alternative implementations of the above-described ME search algorithm are possible. For example, the above-described embodiment utilized a simple (½, ½) averaging filter which may cause aliasing in certain video scenes. An alternative embodiment could utilize a more complex DSP-based filter which avoids the possibility of such aliasing.

The search complexity could be reduced in an alternative embodiment by using temporal scaling techniques. For example, the above-described ME0, ME1 and ME2 stages could search only same-parity field motion vectors. The opposite-parity field vectors and frame vectors are then searched from a starting point determined by scaling the ME2 same-parity field motion vectors. An appropriate scaling factor is the ratio of the distance, in number of field periods, between the target field and the reference field, to the distance between the reference field and the same target field. This ratio is unity when both the reference and the target fields are of the same polarity, as is the case for AA, BB and F motion vectors. TABLE 2 below shows the dependence of the scaling factor on the M value.

TABLE 2

| Motion Vectors | Top_field_first (Target) | Top_field_first (Reference) | M = 1 | M = 2 | M = 3 |
|---|---|---|---|---|---|
| AB | 1 | 1 | 3/2 | 5/4 | 7/6 |
|    | 0 | 0 | 1/2 | 3/4 | 5/6 |
| AB | 1 | 0 | 2   | 4/3 | 6/5 |
|    | 0 | 1 | 3/2 | 5/4 | 7/6 |
| BA | 1 | 1 | 1/2 | 3/4 | 5/6 |
|    | 0 | 0 | 3/2 | 5/4 | 7/6 |
| BA | 1 | 0 | 2/3 | 4/5 | 6/7 |
|    | 0 | 1 | 1/2 | 3/4 | 5/6 |

The search ranges specified in the above-described illustrative embodiment are intended to cover close to the maximum permissible ranges in accordance with the MPEG-2 specification. It should be noted that alternative embodiments could vary the search range pending on, for example, the types of video material being encoded and the frame distances. The search range can be further optimized for hardware constraints and different encoding applications. It should also be noted that the ME0 and ME1 search stages described above need not both begin at the (0,0) motion vector starting position. Alternative starting positions may be used for the ME0 and ME1 search stages.

Early Field/Frame Decision

Figure 5:
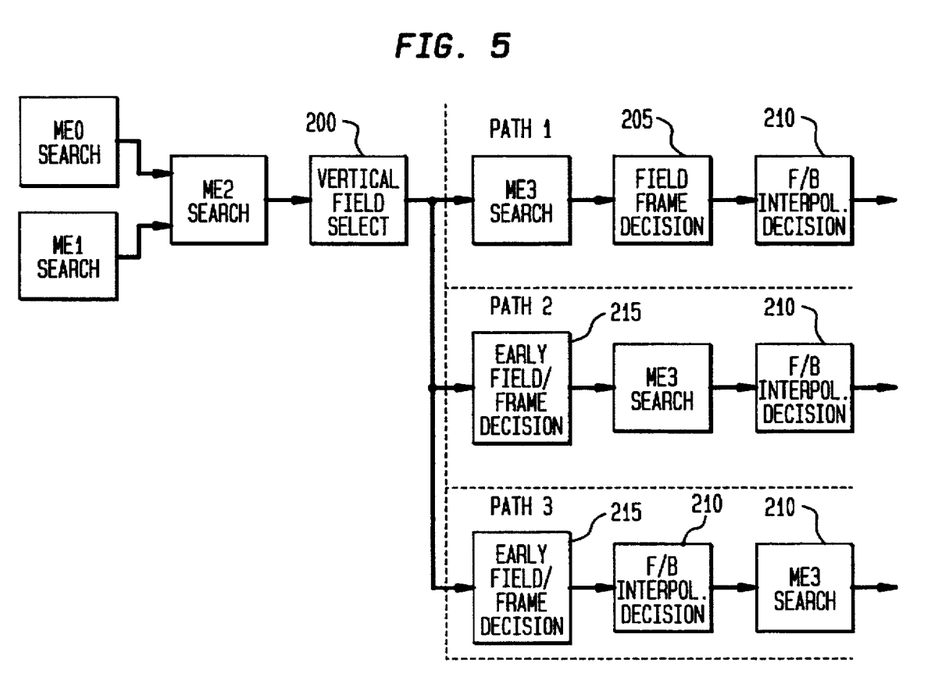
FIG. 5 is a flow diagram illustrating a number of exemplary locations for a field/frame encoding decision in a motion estimation process in accordance with the invention.

The field/frame decision in the above-described exemplary embodiment is performed at the ME3 stage after half-pel searches. In alternative embodiments, the field/frame decision may be made at an earlier stage. FIG. 5 is a flow diagram illustrating a number of possible locations for performance of the field/frame decision relative to the ME3 stage search. As shown in FIG. 5 and described above, the results of the ME0 and ME1 search stages are supplied to the ME2 search stage. After the ME2 search stage, a vertical field selection may be performed as indicated at block 200. There are then at least three possible paths which may be followed. In the first path, the field/frame decision is made after completion of the ME3 search as indicated at block 205. A forward/backward interpolation decision is then made as indicated in block 210. In the second path, an early field/frame decision is made prior to performance of the ME3 search, as indicated at block 215, and the forward/backward interpolation decision is made after completion of the ME3 search. In the third path, both an early field/frame decision and the forward/backward interpolation decision are made prior to the ME3 search. An exemplary early field/frame decision process is illustrated by the following pseudocode:

```
if (abs(Field_AA_X - Field_BB_X) ≤ Error &
    abs(Field_AA_Y - Field_BB_Y) ≤ Error &
    abs(Field_AA_X - Frame_X) ≤ Error &
    abs(Field_AA_Y - Frame_Y) ≤ Error)
    Mode = Frame_MC;
else
    Mode = Field_MC;
```

In other alternative embodiments, the field/frame decision may be made within the ME2 search stage. As noted above, the ME2 stage of the present invention provides accurate motion vectors which permit motion compensation decisions to be performed at an earlier stage of a hierarchical search. Making the field/frame decision during or after the ME2 search stage allows the decision to be based on comparison of motion vectors rather than on a less accurate criteria such as the sum of absolute error. If the difference between field and frame motion vectors is determined to be within a predetermined limited range, frame motion compensation is selected for the ME3 stage. Otherwise, field motion compensation is selected for the ME3 stage. This process may be implemented in accordance with the pseudocode shown above.

A motion estimator in accordance with the present invention may be implemented in hardware, software, firmware or various combinations thereof. For example, the motion estimator may be implemented as a computer, central processing unit, controller, microprocessor, application-specific integrated circuit (ASIC) or other digital data processor or portion thereof programmed to provide the operations described in conjunction with FIG. 3 above. In addition, portions of the motion estimator may be incorporated into one or more of the preprocessor 22, the video compression circuit 26 and the controller 30 of the video encoding system shown in FIG. 1 above.

The above-described embodiments of the invention are intended to be illustrative only. For example, these embodiments generally utilize field and frame motion vector searching based on decimated images. This will generally involve storing field and frame decimated images for the ME2, ME1 and ME0 search stages. As a possible alternative, the field decimated image could be used for frame searching in the ME2 stage, while the ME0 and ME1 stages continue to use frame decimated images. As noted above, any of a number of alternative image resolutions could also be used. Numerous other alternative embodiments within the scope of the appended claims will be readily apparent to those skilled in the art.

I claim:

1. A method for performing motion estimation on a sequence of video images, the method comprising the steps of:

processing an original image in the sequence to generate first, second and third reduced resolution images, wherein the first reduced resolution image has a lower resolution than the second image, the second image has a lower resolution than the third image, and the first and second images being generated independently from said original image; and performing first, second and third stage motion vector searches using the first, second and third reduced resolution images, respectively, wherein the third stage motion vector search uses multiple starting motion vector positions based on the motion vectors determined in the first and second stage motion vector searches for reducing memory bandwidth requirements and increasing efficiency.

2. The method of claim 1 wherein the first, second and third reduced resolution images are generated in both field and frame format.

3. The method of claim 1 wherein the first search range and first reduced resolution image are suitable for detecting global motion in the original image, and the second search range and second reduced resolution image are suitable for detecting local motion in the original image.

4. The method of claim 1 wherein the first stage motion vector search utilizes a first search range which is larger than a search range utilized in the second stage search or the third stage search.

5. The method of claim 1 wherein the first stage utilizes a first search range which is larger than a search range of the second stage search, and the second stage search utilizes a search range which is larger than a search range of the third stage search.

6. The method of claim 1 wherein the first, second and third resolution images are approximately 1/64, 1/16 and 1/4 resolution images, respectively, relative to the original image.

7. The method of claim 1 further including the step of scaling the motion vector results of the third stage search for use in a subsequent fourth stage search of the original image.

8. The method of claim 1 further including the step of using the results of the first, second and third stage searches to determine whether field or frame motion compensation will be used for encoding the original image.

9. The method of claim 1 further including the step of determining whether field or frame compensation will be used for encoding the original image prior to performing a fourth stage motion vector search using an image having a resolution comparable to that of the original image.

10. The method of claim 1 further including the step of performing a fourth stage motion vector search using an image having a resolution comparable to that of the original image.

11. The method of claim 10 wherein the step of performing a fourth stage motion vector search further includes the steps of:

searching field and frame motion vectors for a P frame to identify the motion vector with the lowest distortion; and determining the motion compensation type for the P frame using the identified motion vector.

12. The method of claim 10 wherein the step of performing a fourth stage motion vector search further includes the steps of:

searching field and frame motion vectors for a B frame to identify the motion vector with the lowest activity; and determining the motion compensation type for the B frame using the identified motion vector.

13. The method of claim 10 wherein the step of performing a fourth stage search further includes the steps of:

searching field and frame motion vectors for a B frame to identify the motion vector with the lowest distortion; and determining whether field or frame motion compensation will be used for the B frame based on the identified motion vector.

14. An apparatus for performing motion estimation on a sequence of video images, the apparatus comprising:

a preprocessor having an input for receiving an original image in the sequence and an output corresponding to first, second and third reduced resolution images, wherein the first reduced resolution image has a lower resolution than the second image, the second image has a lower resolution than the third image, and the first and second images being generated independently from said original image; and a motion estimator having an input connected to receive the first, second and third reduced resolution images from the preprocessor and operative to perform first, second and third stage motion vector searches using the first, second and third reduced resolution images, respectively, wherein the third stage motion vector search uses multiple starting motion vector positions based on the motion vectors determined in the first and second stage motion vector searches for reducing memory bandwidth requirements and increasing efficiency.

15. The apparatus of claim 14 wherein the first, second and third reduced resolution images are generated in both field and frame format.

16. The apparatus of claim 14 wherein the first search range and first reduced resolution image are suitable for detecting global motion in the original image, and the second search range and second reduced resolution image are suitable for detecting local motion in the original image.

17. The apparatus of claim 14 wherein the first stage motion vector search utilizes a first search range which is larger than a search range utilized in the second stage search or the third stage search.

18. The apparatus of claim 14 wherein the first stage utilizes a first search range which is larger than a search range of the second stage search, and the second stage search utilizes a search range which is larger than a search range of the third stage search.

19. The apparatus of claim 14 wherein the first, second and third resolution images are 1/64, 1/16 and 1/4 resolution images, respectively, relative to the original image.

20. The apparatus of claim 14 wherein the motion estimator is operative to use the results of the first, second and third stage searches to determine whether field or frame motion compensation will be used for encoding the original image.

21. The apparatus of claim 14 wherein the motion estimator is operative to determine whether field or frame compensation will be used for encoding the original image prior to performing a fourth stage motion vector search using an image having a resolution comparable to that of the original image.

22. The apparatus of claim 14 wherein the motion estimator is further operative to scale the motion vector results of the third stage search for use in a subsequent fourth stage search of the original image.

23. The apparatus of claim 14 wherein the motion estimator is further operative to perform a fourth stage motion vector search using an image having a resolution comparable to that of the original image.

24. The apparatus of claim 23 wherein the fourth stage motion vector search involves searching field and frame motion vectors for a P frame to identify the motion vector with the lowest distortion, and determining the motion compensation type for the P frame using the identified motion vector.

25. The apparatus of claim 23 wherein the fourth stage motion vector search involves searching field and frame motion vectors for a B frame to identify the motion vector with the lowest distortion, and determining whether field or frame motion compensation will be used for the B frame based on the identified motion vector.

26. The apparatus of claim 23 wherein the fourth stage motion vector search involves searching field and frame motion vectors for a B frame to identify the motion vector with the lowest activity, determining the motion compensation type for the B frame using the identified motion vector.

27. A method for performing motion estimation on a sequence of video images, the method comprising the steps of:

processing an original image in the sequence to generate a constant block size corresponding to at least three different pixel area images of said original image, each said pixel area image differing in size based on a corresponding different reduced resolution of said original image; and performing multiple stage motion vector searches using said constant block size for searching each of said at least three different pixel area images, respectively, wherein the last stage of said multiple stage motion vector searches uses at least two starting motion vector positions, each said position based on the motion vectors determined in a respective previous stage motion vector search for reducing memory bandwidth requirements and increasing efficiency.

28. The method of claim 27, wherein said step of processing generates first, second and third pixel area images corresponding to first, second and third reduced resolutions, respectively, wherein the first reduced resolution image has a lower resolution than the second image, the second image has a lower resolution than the first image, and the first and second images being generated independently from said original image; and wherein said step of performing performs first, second and third stage motion vector searches using the first, second and third pixel area images, respectively, wherein the third stage motion vector search uses multiple starting motion vector positions based on the motion vectors determined in the first and second stage motion vector searches.

29. The method of claim 28, wherein said constant block size is an 8×8 pixel area, wherein the first stage search uses a first pixel area image of 64×64 pixels to determine one of said multiple starting motion vector positions, and wherein the second stage search uses a second pixel area image of 32×32 pixels to determine another of said multiple starting motion vector positions.

30. An apparatus for performing motion estimation on a sequence of video images, the apparatus comprising:

a preprocessor having an input for receiving an original image in the sequence and an output which outputs a constant block size corresponding to at least three different pixel area images of said original image, each said pixel area image differing in size based on a corresponding different reduced resolution of said original image; and a motion estimator having an input connected to receive said constant block size and said pixel area images from the preprocessor and operative to perform multiple stage motion vector searches using said constant block size for searching each of said at least three different pixel area images, respectively, wherein the last stage of said multiple stage motion vector searches uses at least two starting motion vector positions, each said position based on the motion vectors determined in a respective previous stage motion vector search for reducing memory bandwidth requirements and increasing efficiency.

31. The apparatus of claim 30, wherein said preprocessor outputs first, second and third pixel area images corresponding to first, second and third reduced resolutions, respectively, wherein the first reduced resolution image has a lower resolution than the second image, the second image has a lower resolution than the first image, and the first and second images being generated independently from said original image; and wherein said motion estimator performs first, second and third stage motion vector searches using the first, second and third pixel area images, respectively, wherein the third stage motion vector search uses multiple starting motion vector positions based on the motion vectors determined in the first and second stage motion vector searches.

32. The apparatus of claim 31, wherein said constant block size is an 8×8 pixel area, wherein the first stage search uses a first pixel area image of 64×64 pixels to determine one of said multiple starting motion vector positions, and wherein the second stage search uses a second pixel area image of 32×32 pixels to determine another of said multiple starting motion vector positions.

* * * * *